(12) United States Patent
Asadi-Zanjani et al.

(10) Patent No.: US 11,308,605 B2
(45) Date of Patent: Apr. 19, 2022

(54) IMAGE PROCESSING FOR PRINTED CIRCUIT BOARD COMPONENT DETECTION

(71) Applicant: University of Florida Research Foundation, Incorporated, Gainesville, FL (US)

(72) Inventors: Navid Asadi-Zanjani, Gainesville, FL (US); Mark M. Tehranipoor, Gainesville, FL (US); Mukhil Azhagan Mallaiyan Sathiaseelan, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 0 days.

(21) Appl. No.: 17/149,097

(22) Filed: Jan. 14, 2021

(65) Prior Publication Data
US 2021/0256683 A1 Aug. 19, 2021

Related U.S. Application Data

(60) Provisional application No. 62/976,752, filed on Feb. 14, 2020.

(51) Int. Cl.
*G06T 7/00* (2017.01)
*G06T 7/10* (2017.01)
(Continued)

(52) U.S. Cl.
CPC .............. *G06T 7/0004* (2013.01); *G06T 7/10* (2017.01); *G06T 7/136* (2017.01); *G06T 7/194* (2017.01);
(Continued)

(58) Field of Classification Search
CPC ......... G06T 7/10–12; G06T 7/136–194; G06T 2207/30141; G06T 7/0002; G06T 7/0004;
(Continued)

(56) References Cited

U.S. PATENT DOCUMENTS

2019/0303522 A1* 10/2019 Green ................... G06F 30/39
2020/0143582 A1* 5/2020 Matsushita ............. G06T 15/20

FOREIGN PATENT DOCUMENTS

KR 101428923 B1 * 8/2014

OTHER PUBLICATIONS

Chen, Rui. "A PCB Image Self-adaption Threshold Segmentation Method Fusing Color Information and OTSU Theory." 2019 IEEE 8th Joint International Information Technology and Artificial Intelligence Conference (ITAIC). IEEE, 2019. (Year: 2019).*
(Continued)

*Primary Examiner* — Geoffrey E Summers
(74) *Attorney, Agent, or Firm* — Alston & Bird LLP

(57) ABSTRACT

There is a need for more effective and efficient printed circuit board (PCB) design. This need can be addressed by, for example, solutions for performing automated PCB component estimation. In one example, a method includes identifying a PCB image of a PCB; performing chromaticity-based background subtraction on the PCB image to generate a background-subtracted PCB image; performing morphological noise removal on the background-subtracted PCB image to generate a noise-removed PCB image; and performing object localization on the noise-removed PCB image to identify one or more PCB component estimations within the noise-removed PCB image.

20 Claims, 10 Drawing Sheets

(51) Int. Cl.
- *G06T 7/136* (2017.01)
- *G06T 7/194* (2017.01)
- *G06T 7/254* (2017.01)
- *G06T 7/50* (2017.01)

(52) U.S. Cl.
CPC .............. *G06T 7/254* (2017.01); *G06T 7/50* (2017.01); *G06T 2207/20036* (2013.01); *G06T 2207/30141* (2013.01)

(58) Field of Classification Search
CPC ..... G06T 7/0006; G06T 7/0008; G06T 7/001; G06T 7/254; G06T 7/50; G06T 2207/20036
USPC .......................................... 382/173, 145–151
See application file for complete search history.

(56) References Cited

OTHER PUBLICATIONS

Quadir, Shahed E., et al. "A survey on chip to system reverse engineering." ACM journal on emerging technologies in computing systems (JETC) 13.1 (2016): 1-34. (Year: 2016).*

Che Mat, Ruzinoor, et al. "Morphological operation on printed circuit board (PCB) reverse engineering using MATLAB." (2006): 529-533. (Year: 2006).*

Kim, Jun-Oh, Youn-Ae Lee, and Tae-Hyoung Park. "Automatic extraction of component inspection regions from Printed Circuit Board." 2012 IEEE/SICE International Symposium on System Integration (SII). IEEE, 2012. (Year: 2012).*

Raihan, Fa'lq and Win Ce. "PCB defect detection Using OPENCV with image subtraction method." 2017 International Conference on Information Management and Technology (ICIMTech). IEEE, 2017. (Year: 2017).*

Ren, Xiaofeng et al. "Learning A Classification Model For Segmentation," *Proceedings Ninth IEEE International Conference on Computer Vision*, vol. 1, Oct. 13, 2003, (8 pages), Nice, France. DOI: 10.1109/ICCV.2003.1238308.

Felzenszwalb, Pedro F. et al. "Efficient Graph-Based Image Segmentation," *International Journal of Computer Vision*, vol. 59, No. 2, (2004), pp. 167-181, The Netherlands.

Vedaldi, Andrea et al. "Quick Shift And Kernel Methods For Mode Seeking," *In: Forsyth D., Torr P., Zisserman A. (eds) Computer Vision—ECCV 2008, Part IV, Lecture Notes in Computer Science*, vol. 5305, pp. 705-718. Springer, Berlin, Heidelberg. DOI: 10.1007/978-3-540-88693-8_52.

Achanta, Radhakrishna et al. "SLIC Superpixels Compared to State-Of-The-Art Superpixel Methods," *Journal of Latex Class Files*, vol. 6, No. 1, Dec. 2011, pp. 1-8.

Neubert, Peer et al. "Compact Watershed and Preemptive SLIC: On Improving Trade-offs of Superpixel Segmentation Algorithms," *2014 22$^{nd}$ International Conference On Pattern Recognition*, Aug. 24, 2014, pp. 996-1001. IEEE Computer Society. DOI: 10.1109/ICPR.2014.181.

Azhagan, Mukhil et al. "A New Framework for Automated Bill of Material Generation and Visual Inspection," *ISTFA 2019: Conference Proceedings From The 45$^{th}$ International Symposium on Test and Failure Analysis*, Nov. 10-14, 2019, pp. 256-265. Portland, Oregon, USA.

Salvador, Elena et al. "Cast Shadow Segmentation Using Invariant Color Features," *Computer Vision and Image Understanding 95*, (2004), pp. 238-259. DOI:10.1016/j.cviu.2004.03.008.

Daum, M. et al. "On 3-D Surface Reconstruction Using Shape From Shadows," *In Proceedings. 1998 IEEE Computer Society Conference on Computer Vision and Pattern Recognition* (Cat. No. 98CB36231), Jun. 25, 1998, (9 pages). IEEE. DOI: 10.1109/cvpr.1998.698646.

Kriegman, David J. et al. "What Shadows Reveal About Object Structure," Lecture Notes In Computer Science (Including Subser Lect Notes Artif Intell Lect Notes Bioinformatics), *In Burkhardt H., Neumann B. (eds) Computer Vision—ECCV'98. European Conference On Computer Vision*, vol. 1407, pp. 399-414. DOI:10.1007/BFb0054755.

Kriegman, David J. et al. "What Shadows Reveal About Object Structure," *Journal of the Optical Society of America, A, Optics, Image, Science and Vision*, vol. 18, No. 8, Aug. 2001, pp. 1804-1813.

Belhumeur, Peter N. et al. "The Bas-Relief Ambiguity," *International Journal of Computer Vision*, Vo. 35, No. 1, (1999), pp. 33-44, The Netherlands. DOI: 10.1023/A:1008154927611.

Ahu, Jiejie et al. "Learning To Recognize Shadows In Monochromatic Natural Images," *In 2010 IEEE Computer Society Conference On Computer Vision and Pattern Recognition*, Jun. 13, 2010, (8 pages). DOI: 10.1109/CVPR.2010.5540209.

Barrow, Harry G. et al. "Recovering Intrinsnic Scene Characteristics From Images," In: Hanson A, Riseman E, editors. *Computer Vision Systems*, Apr. 1978, pp. 2-25. Academic Press Inc., New York, USA.

* cited by examiner

IMAGE PROCESSING FOR PRINTED CIRCUIT BOARD COMPONENT DETECTION

CROSS-REFERENCE TO RELATED APPLICATIONS

This application claims the benefit of U.S. Provisional Patent Application Ser. No. 62/976,752, filed Feb. 14, 2020, which is incorporated herein by reference in its entirety, including any figures, tables, and drawings.

BACKGROUND

Various embodiments of the present invention address technical challenges related to automated detection of printed circuit board (PCB) components. More specifically, various embodiments of the present invention are directed to innovative techniques for detecting PCB components, generating bills of materials for PCBs, and designing manufacturing processes of PCBs.

BRIEF SUMMARY

In general, embodiments of the present invention provide methods, apparatus, systems, computing devices, computing entities, and/or the like for performing printed circuit board (PCB) component estimation. In accordance with one aspect of the present disclosure, a method is provided. In various embodiments, the method comprises performing chromaticity-based background subtraction via one or more processors executing on a PCB design computing entity on a PCB image of the PCB to generate a background-subtracted PCB image, wherein the chromaticity-based background subtraction comprises: for each particular pixel in the PCB image, determining a normalized chromatic intensity measure for the particular pixel, determining whether the normalized chromatic intensity measure satisfies a chromatic intensity threshold, responsive to determining the normalized chromatic intensity measure satisfies the chromatic intensity threshold, generating a modified pixel for the particular pixel within the background-subtracted PCB image that indicates that the particular pixel is a background pixel, and responsive to determining the normalized chromatic intensity measure fails to satisfy the chromatic intensity threshold, generating the modified pixel for the particular pixel within the background-subtracted PCB image that indicates that the particular pixel is a foreground pixel; performing morphological noise removal on the background-subtracted PCB image via the one or more processors executing on the PCB design computing entity to generate a noise-removed PCB image, wherein the morphological noise removal comprises performing a sequence of at least one of one or more morphological erosions or one or more morphological dilations on the background-subtracted PCB image; performing object localization on the noise-removed PCB image via the one or more processors executing on the PCB design computing entity to identify one or more PCB component estimations within the noise-removed PCB image, wherein the object localization comprises performing segmentation on the noise-removed PCB image to detect contiguous pixel segments within the noise-removed PCB image to identify the one or more PCB component estimations; generating a bill of materials for the PCB by the one or more processors executing on the PCB design computing entity using the one or more PCB component estimations; and refining one or more PCB manufacturing processes based at least in part on the bill of materials.

In accordance with another aspect of the present disclosure, an apparatus is provided. In various embodiments, the apparatus includes at least one processor and at least one memory including program code. The at least one memory and the program code are configured to, with the at least one processor, cause the apparatus to at least: perform chromaticity-based background subtraction on a PCB image of the PCB to generate a background-subtracted PCB image, wherein the chromaticity-based background subtraction comprises: for each particular pixel in the PCB image, determining a normalized chromatic intensity measure for the particular pixel, determining whether the normalized chromatic intensity measure satisfies a chromatic intensity threshold, responsive to determining the normalized chromatic intensity measure satisfies the chromatic intensity threshold, generating a modified pixel for the particular pixel within the background-subtracted PCB image that indicates that the particular pixel is a background pixel, and responsive to determining the normalized chromatic intensity measure fails to satisfy the chromatic intensity threshold, generating the modified pixel for the particular pixel within the background-subtracted PCB image that indicates that the particular pixel is a foreground pixel; perform morphological noise removal on the background-subtracted PCB image to generate a noise-removed PCB image, wherein the morphological noise removal comprises performing a sequence of at least one of one or more morphological erosions or one or more morphological dilations on the background-subtracted PCB image; perform object localization on the noise-removed PCB image to identify one or more PCB component estimations within the noise-removed PCB image, wherein the object localization comprises performing segmentation on the noise-removed PCB image to detect contiguous pixel segments within the noise-removed PCB image to identify the one or more PCB component estimations; generate a bill of materials for the PCB using the one or more PCB component estimations; and refine one or more PCB manufacturing processes based at least in part on the bill of materials.

In accordance with yet another aspect of the present disclosure, a computer program product is provided. In particular embodiments, the computer program product includes a non-transitory computer storage medium having instructions stored therein. The instructions being configured to cause one or more processors to at least perform operations configured to: perform chromaticity-based background subtraction on a PCB image of the PCB to generate a background-subtracted PCB image, wherein the chromaticity-based background subtraction comprises: for each particular pixel in the PCB image, determining a normalized chromatic intensity measure for the particular pixel, determining whether the normalized chromatic intensity measure satisfies a chromatic intensity threshold, responsive to determining the normalized chromatic intensity measure satisfies the chromatic intensity threshold, generating a modified pixel for the particular pixel within the background-subtracted PCB image that indicates that the particular pixel is a background pixel, and responsive to determining the normalized chromatic intensity measure fails to satisfy the chromatic intensity threshold, generating the modified pixel for the particular pixel within the background-subtracted PCB image that indicates that the particular pixel is a foreground pixel; perform morphological noise removal on the background-subtracted PCB image to generate a noise-removed PCB image, wherein the morphological noise removal comprises performing a sequence of at least one of one or more morphological erosions or one or more morphological dilations on the background-subtracted PCB image; perform object localization on the noise-removed PCB image to identify one or more PCB component estimations within the noise-removed PCB image, wherein the object localization comprises performing segmentation on the noise-removed PCB image to detect contiguous pixel segments within the noise-removed PCB image to identify the one or more PCB component estimations; generate a bill of materials for the PCB using the one or more PCB component estimations; and refine one or more PCB manufacturing processes based at least in part on the bill of materials.

In particular embodiments, determining the normalized chromatic intensity measure for the particular pixel is carried out by performing a normalization of a pixel value for a colorfulness component of a chromatic representation of a color value for the particular pixel across color intensity channels associated with the pixel value. In some embodiments, the segmentation is performed on foreground pixels of the noise-removed PCB image. In some embodiments, the segmentation is a depth-first-search-based segmentation. In addition, in some embodiments, an output image is displayed that highlights respective locations of the one or more PCB component estimations within the PCB image. Further, in some embodiments, the PCB image is a non-direct-lighting image of the PCB.

BRIEF DESCRIPTION OF THE DRAWINGS

Figure 1A:
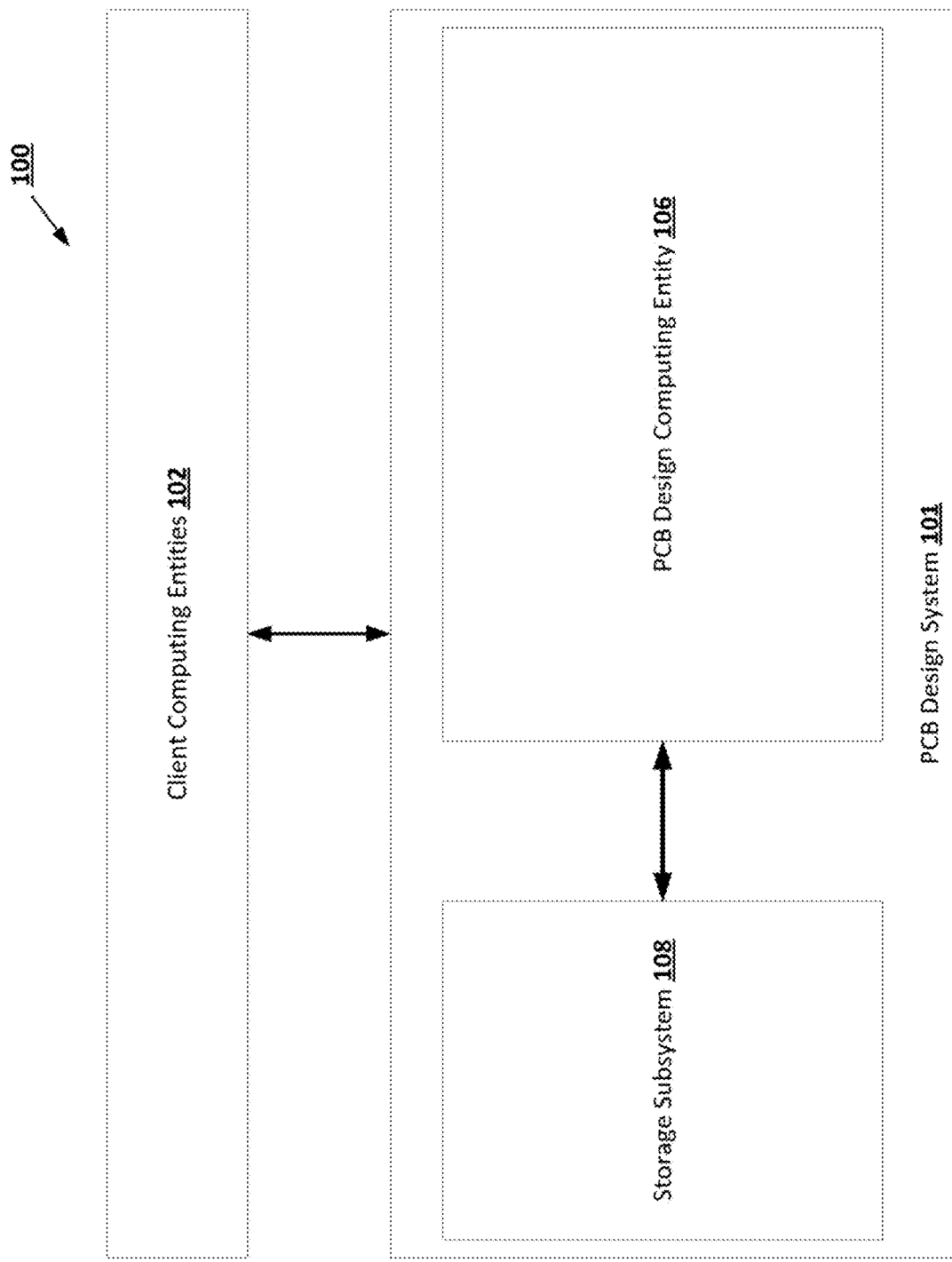

Having thus described the invention in general terms, reference will now be made to the accompanying drawings, which are not necessarily drawn to scale, and wherein:

FIG. 1A provides an exemplary overview of a hardware architecture that can be used to practice embodiments of the present invention.

Figure 1B:
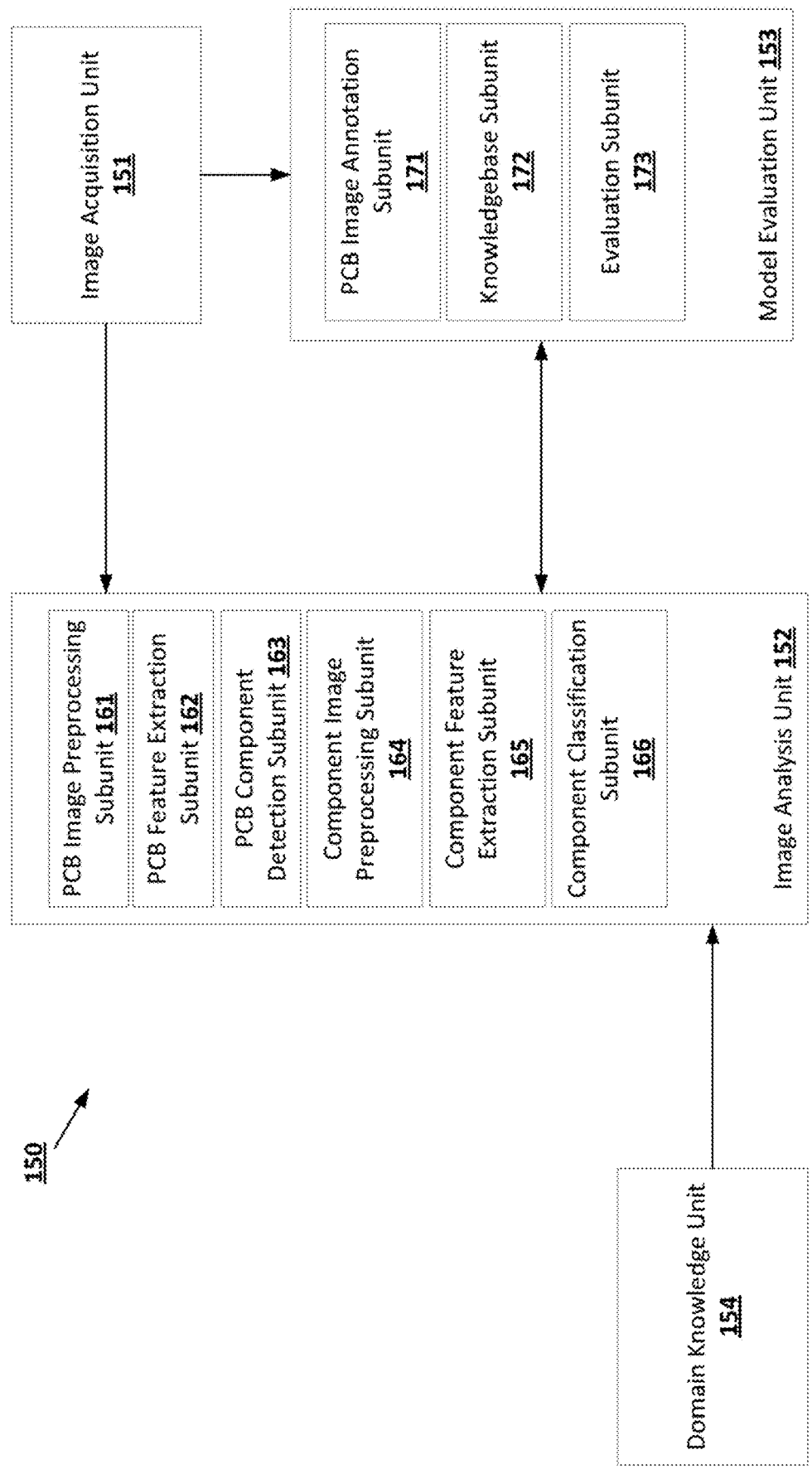

FIG. 1B provides an exemplary overview of a software architecture that can be used to practice embodiments of the present invention.

Figure 2:
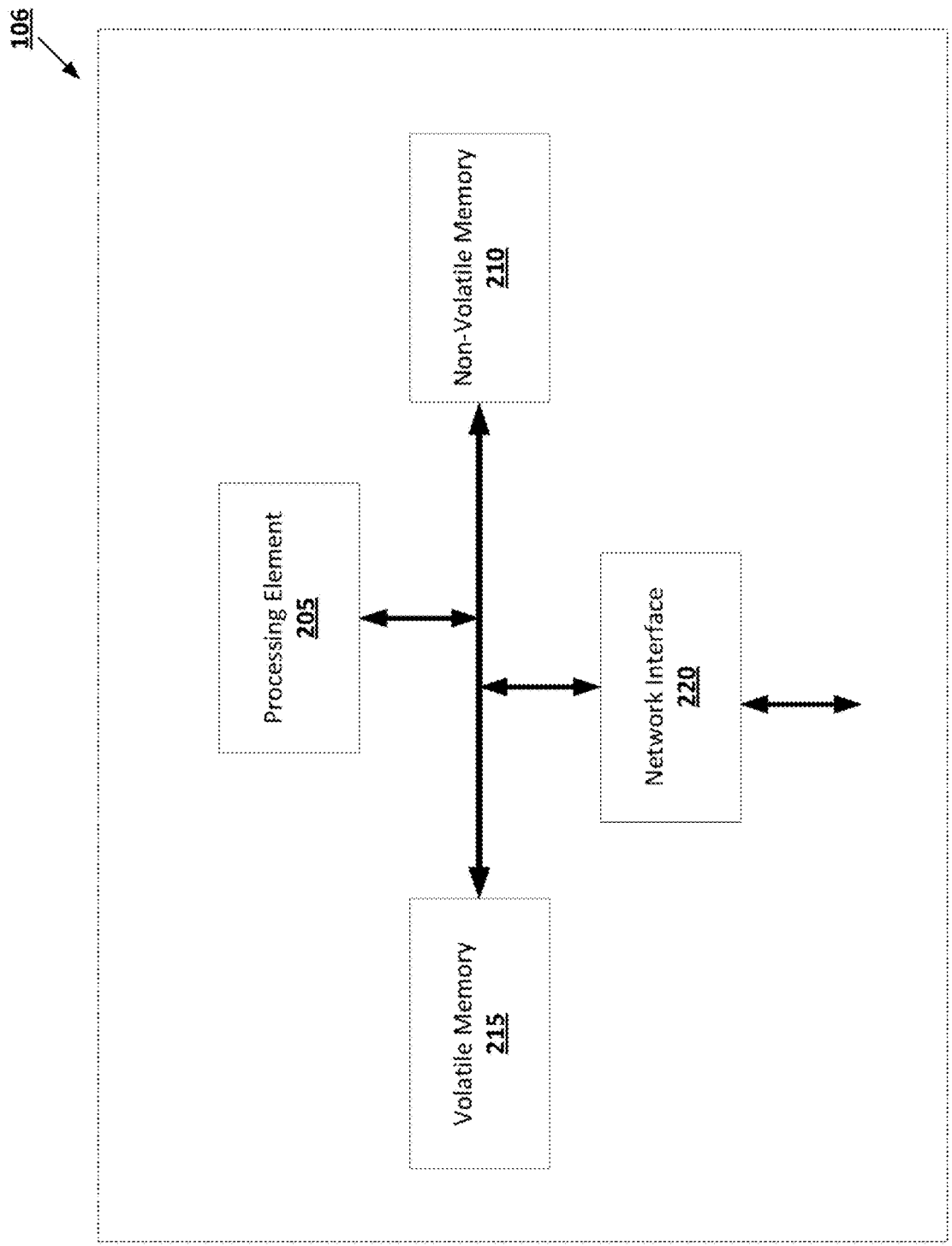

FIG. 2 provides an example PCB design computing entity in accordance with some embodiments discussed herein.

Figure 3:
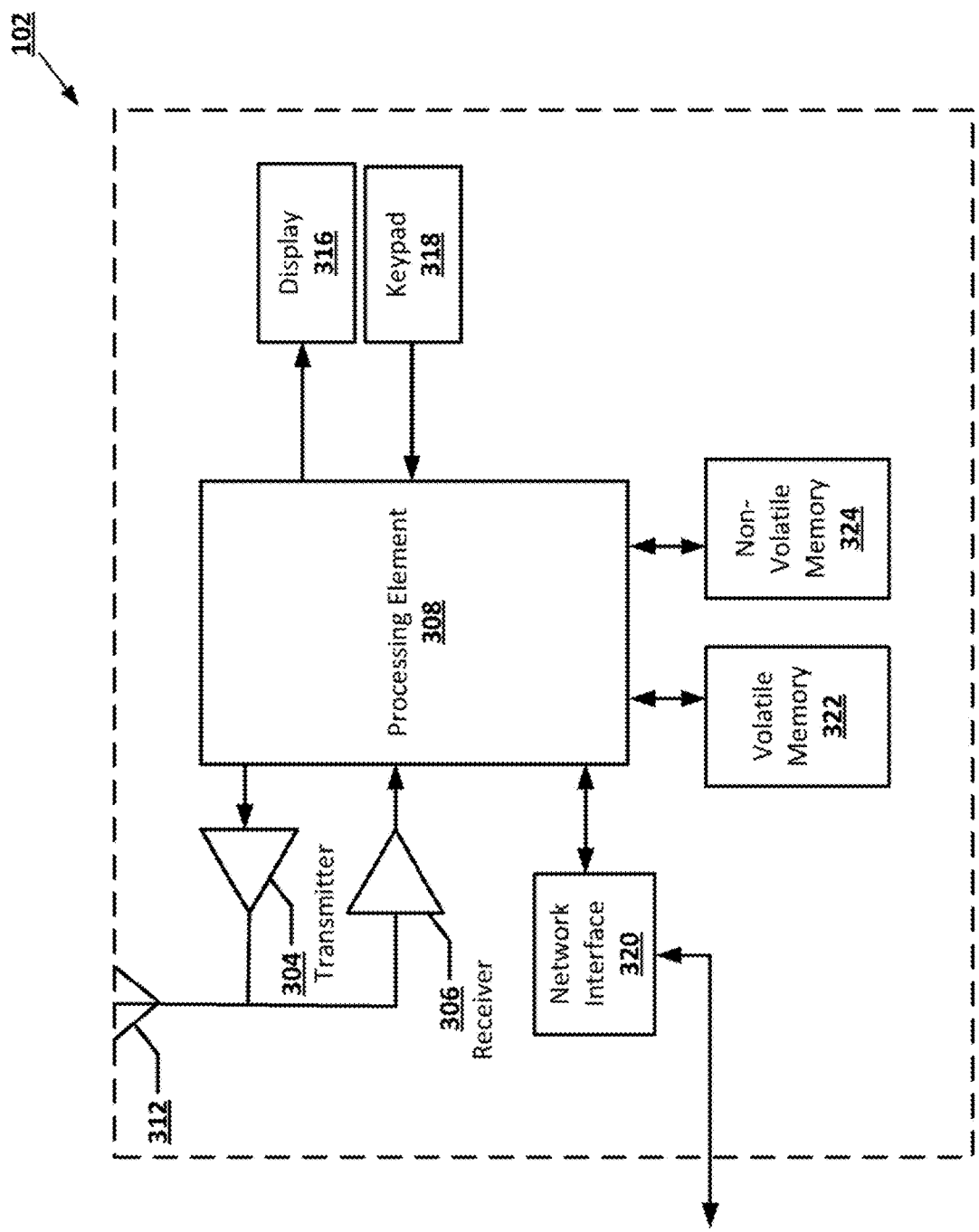

FIG. 3 provides an example client computing entity in accordance with some embodiments discussed herein.

Figure 4:
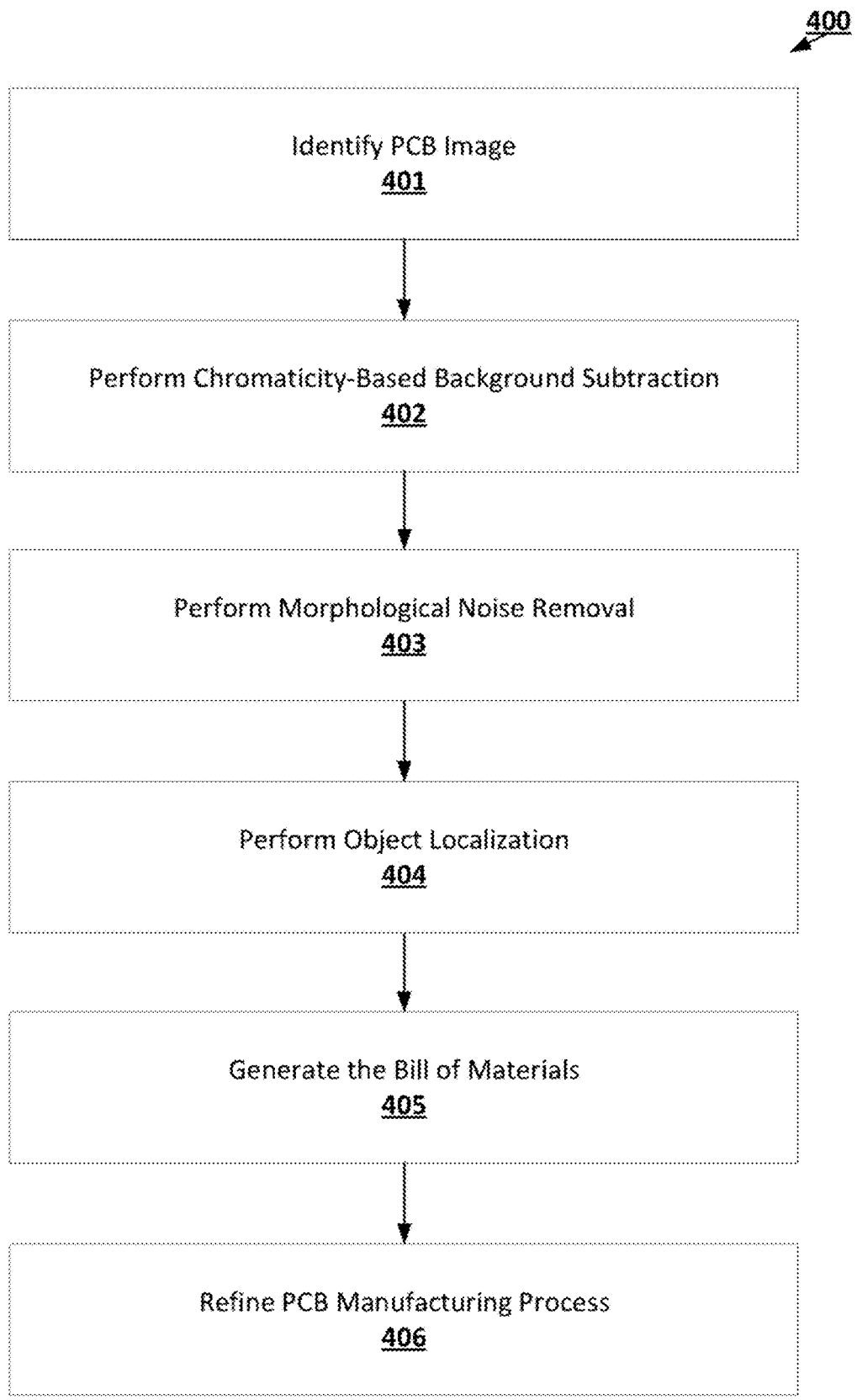

FIG. 4 is a flowchart diagram of an example process for performing automated PCB component detection in accordance with some embodiments discussed herein.

Figure 5:
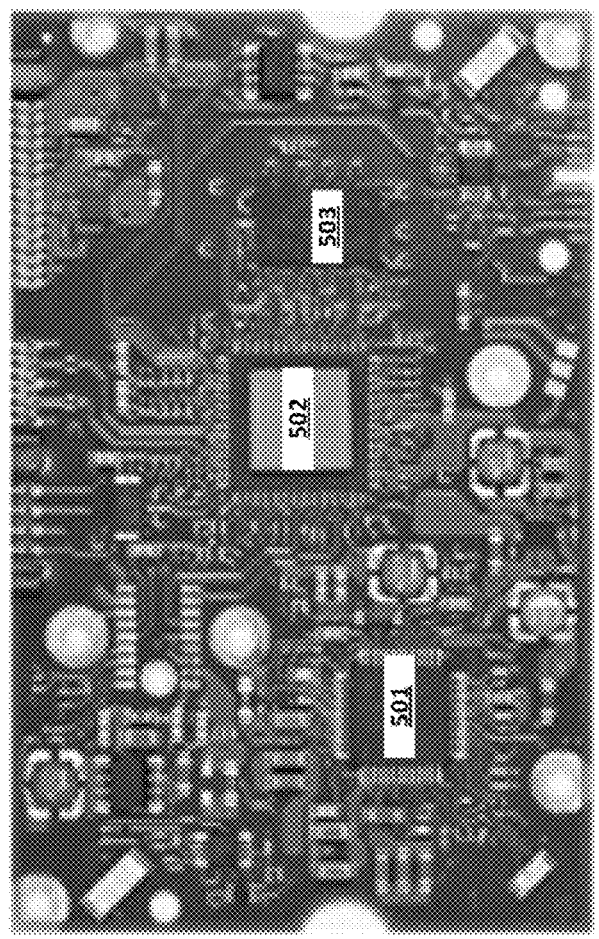

FIG. 5 provides an operational example of a non-direct-lighting image in accordance with some embodiments discussed herein.

Figure 6:
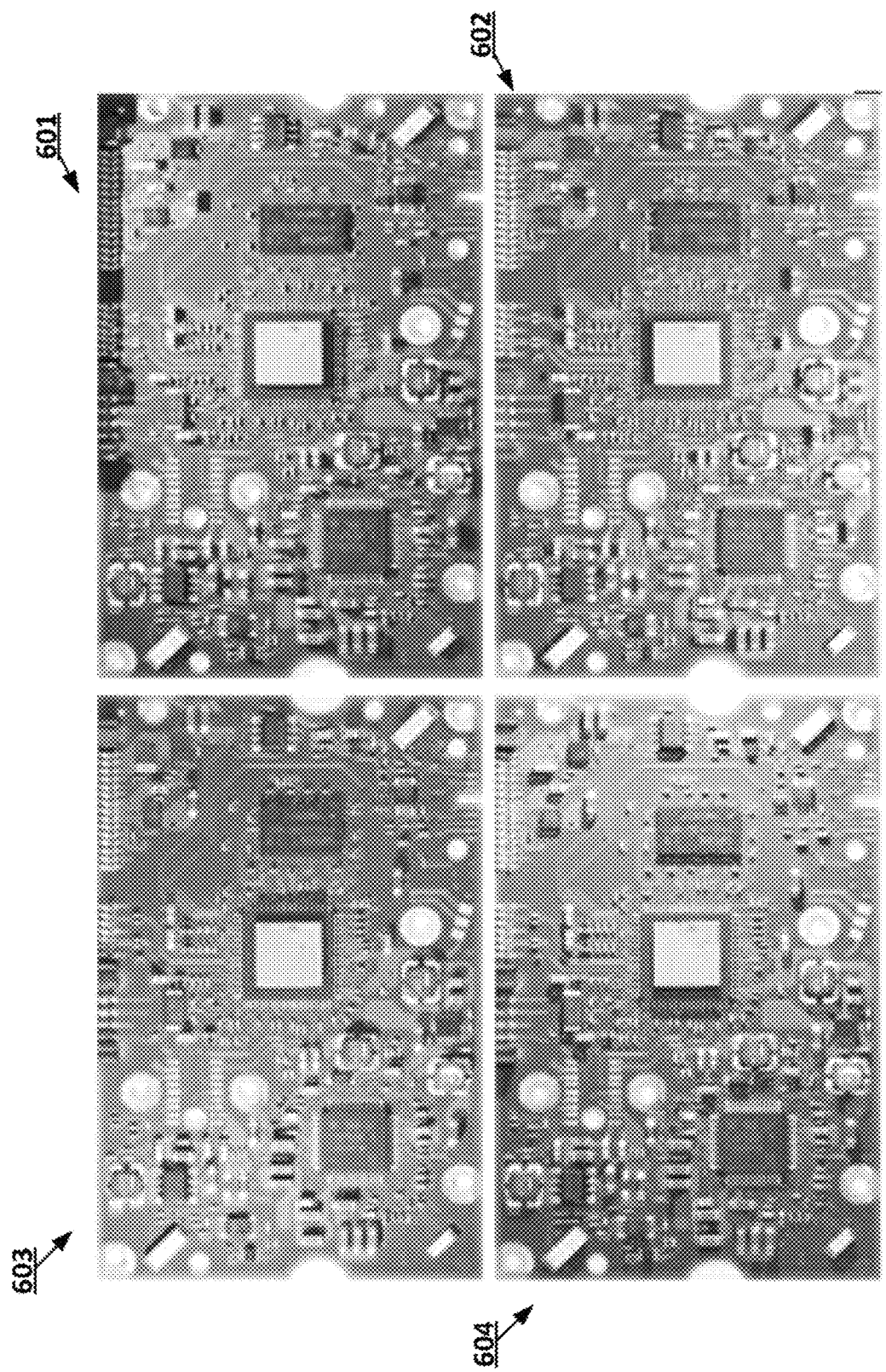

FIG. 6 provides operational examples of direct-lighting images in accordance with some embodiments discussed herein.

Figure 7:
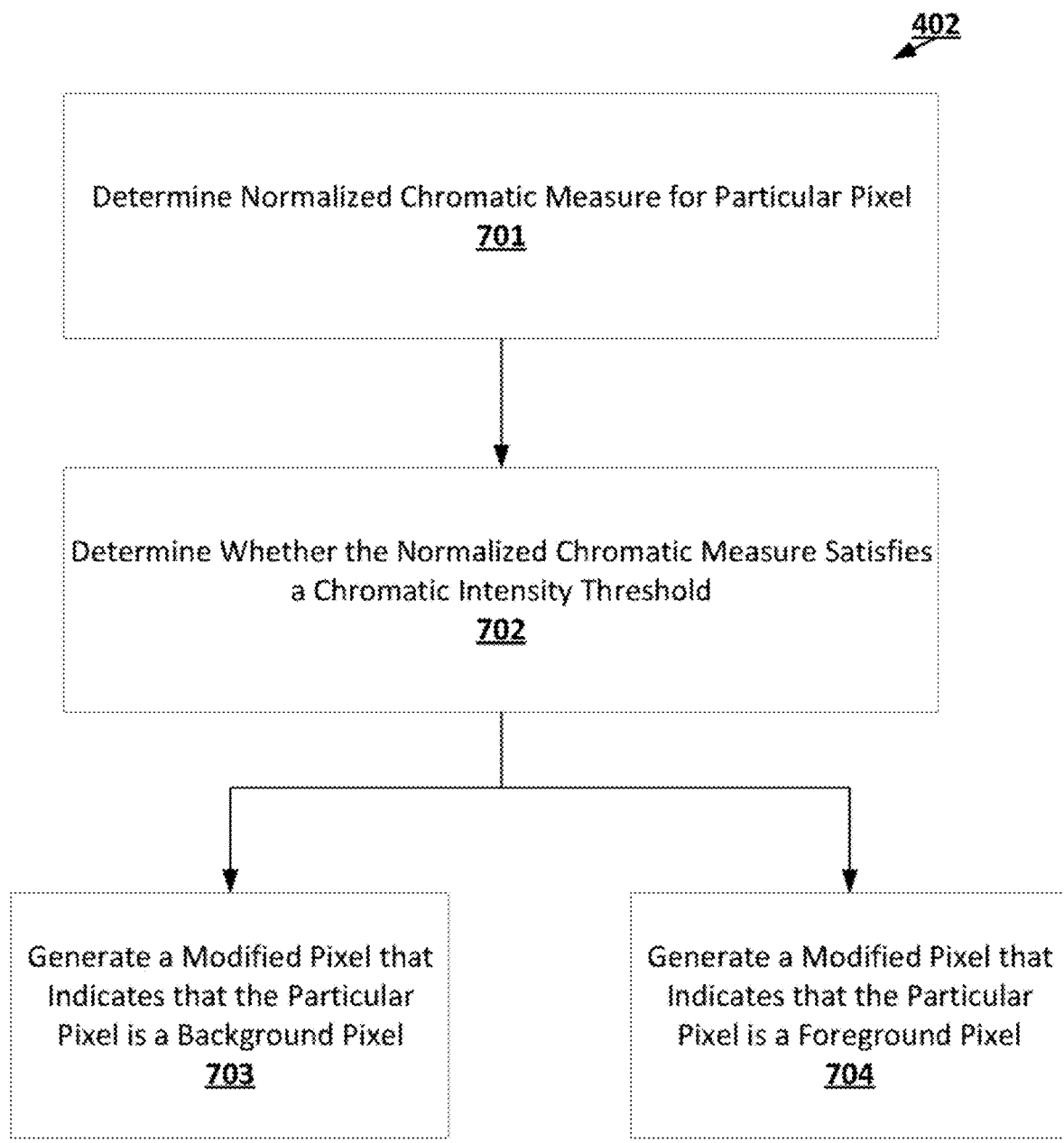

FIG. 7 is a flowchart diagram of an example process for performing chromaticity-based background subtraction on a pixel of a PCB image in accordance with some embodiments discussed herein.

Figure 8:
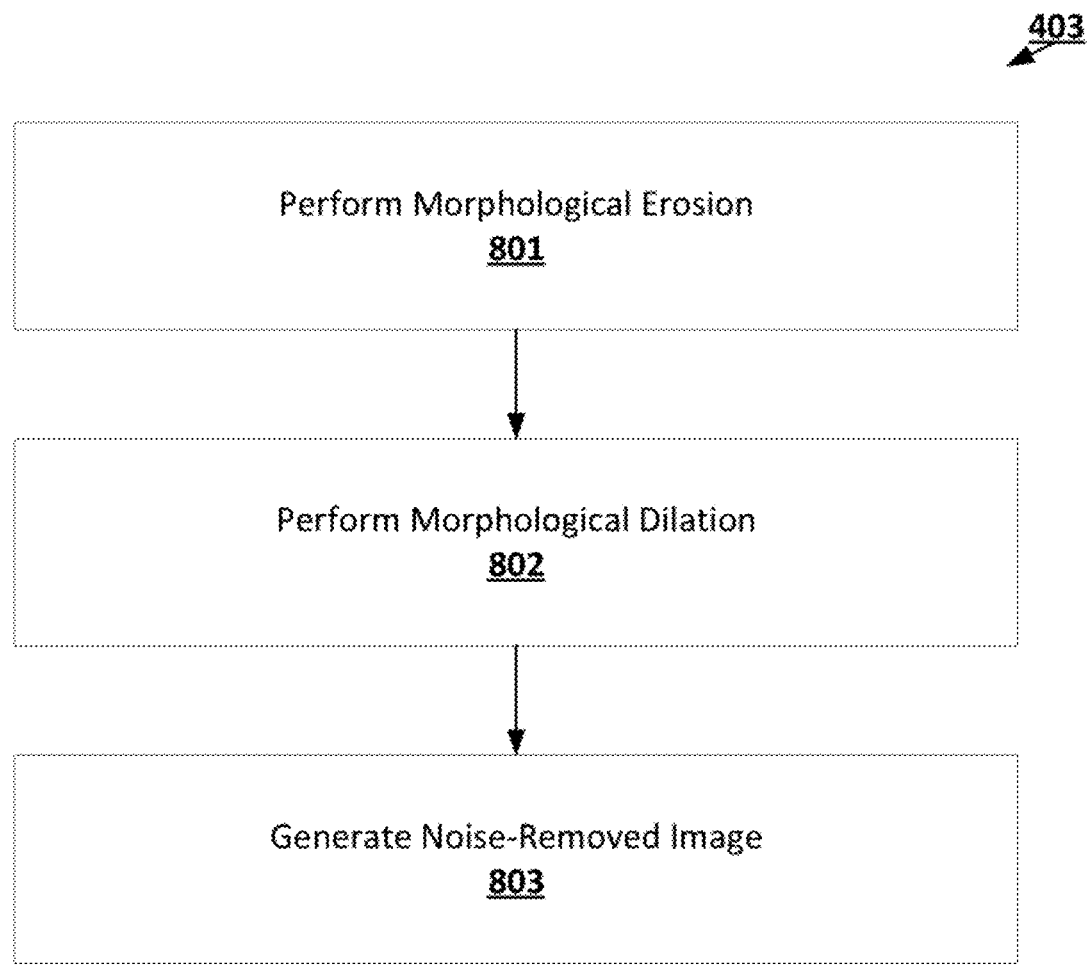

FIG. 8 is a flowchart diagram of an example process for performing morphological noise removal on a background-subtracted PCB image in accordance with some embodiments discussed herein.

Figure 9:
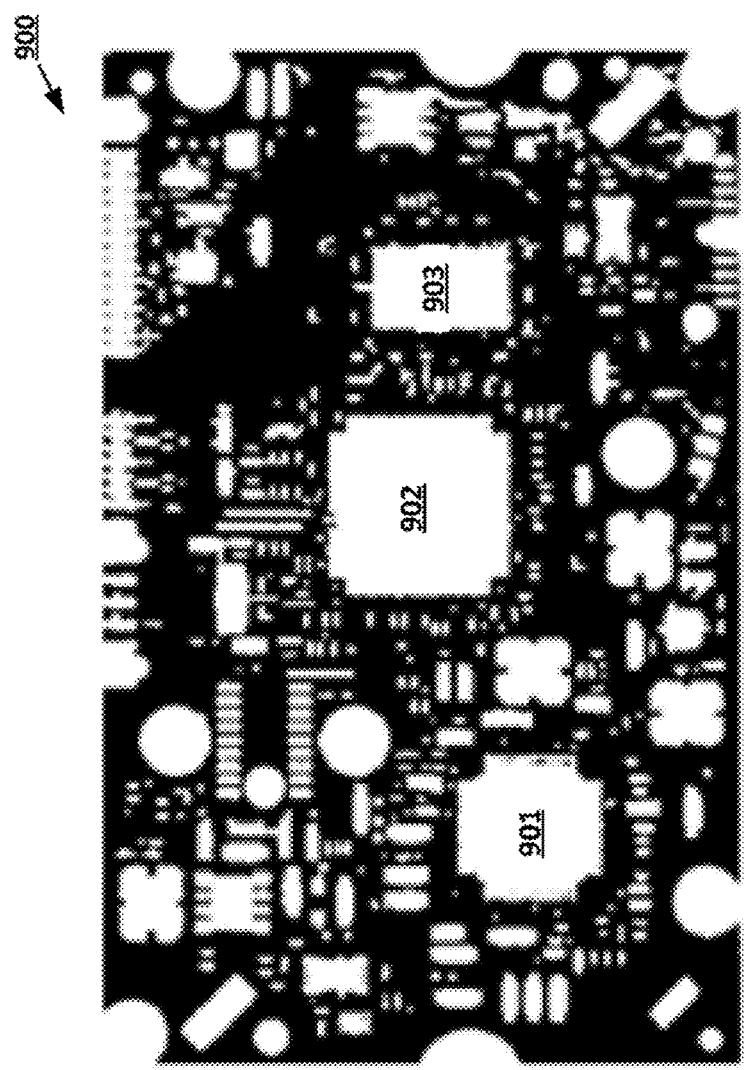

FIG. 9 provides an operational example of a PCB component estimation output image in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview

Various embodiments of the present invention provide techniques for automated PCB component detection using image processing. Specifically, in various embodiments, one or more PCB component estimations are identified for a PCB by identifying a PCB image of the PCB and performing chromaticity-based background subtraction on the PCB image to generate a background-subtracted PCB image. Once generated, morphological noise removal may be performed on the background-subtracted PCB image to generate a noise-removed PCB image. At that point, object localization may be performed on the noise-removed PCB image to identify the one or more PCB component estimations within the noise-removed PCB image. Accordingly, by enabling automated PCB component detection, various embodiments of the present invention can increase the efficiency of PCB component detection. Since PCB component detection is an important component of PCB manufacturing, the disclosed techniques can be utilized to more efficiently generate bills of materials for PCBs as well as to refine PCB manufacturing processes to increase the efficiency of the noted PCB manufacturing processes.

In some embodiments, performing morphological noise removal subsequent to chromaticity-based background subtraction improves the computational efficiency of performing morphological noise removal, as in this process morphological noise removal can be performed on the foreground of a background-subtracted image only, an approach that in turn reduces the relevant domain of noise removal and thus in turn reduces the number of operations that need to be performed to accomplish noise removal. In some of the noted embodiments, by performing morphological noise removal subsequent to chromaticity-based background subtraction, the noted embodiments of the present invention improve the computational efficiency of performing PCB component detection and/or the computational efficiency of performing morphological noise removal by reducing the number of processing cycles needed to perform PCB component detection and/or morphological noise removal.

II. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

FIG. 1A is a schematic diagram of an example architecture 100 for performing automated PCB component detection. The hardware architecture 100 includes a PCB design system 101 configured to receive PCB images from one or more client computing entities 102, process the PCB images to identify PCB component estimations within corresponding PCBs, and, in some embodiments, utilize the PCB component estimations in generating a bills of materials from the PCB component estimations and/or refining a PCB manufacturing process.

In some embodiments, the PCB design system 101 may communicate with the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The PCB design system 101 may include a PCB design computing entity 106 and a storage subsystem 108. The PCB design computing entity 106 may be configured to perform automated PCB component estimations and refine PCB manufacturing processes based at least in part on the automated PCB component estimations. The storage subsystem 108 may be configured to store PCB images used by the PCB design computing entity 106 to perform automated PCB component detection. The storage subsystem 108 may further be configured to store model definition data for detection models used by the PCB design computing entity 106 to perform automated PCB component detection.

The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

FIG. 1B is a schematic diagram of a software architecture 150 for performing automated PCB component detection according to various embodiments. The software architecture 150 includes an image acquisition unit 151, an image analysis unit 152, a model evaluation unit 153, and a domain knowledge unit 154.

The image acquisition unit 151 may be configured to obtain (e.g., receive and/or capture) PCB images that are then passed on to the image analysis unit 152 and the model evaluation unit 153. The image analysis unit 152 may be configured to process the PCB images to generate one or more PCB component estimations for each PCB. The model evaluation unit 153 may be configured to compare PCB component estimations generated by the image analysis unit 152 to ground-truth PCB component estimations in order to generate a measure of detection accuracy of one or more detection models utilized by the image analysis unit 152. The domain knowledge unit 154 may be configured to provide data regarding PCB common industry design standards and/or other PCB-related domain knowledge information to the image analysis unit 152.

The image analysis unit 152 may include a PCB image preprocessing subunit 161, a PCB feature extraction subunit 162, a PCB component detection subunit 163, a component image preprocessing subunit 164, a component feature extraction subunit 165, and a component classification subunit 166.

The PCB image preprocessing subunit 161 may be configured to modify PCB images to ensure that images of similar PCBs taken under different conditions still yield similar features after PCB feature extraction performed by the PCB feature extraction subunit 162. The PCB feature extraction subunit 162 may be configured to extract features such as color-based features and texture-based features from each modified PCB image generated by the PCB image preprocessing subunit 161. The PCB component detection subunit 163 may be configured to detect regions within PCB images where PCB components are located. The component image preprocessing subunit 164 may be configured to modify images of PCB components detected by the PCB component detection subunit 163 to ensure that images of similar PCB components taken under different conditions still yield similar features after component feature extraction performed by the component feature extraction subunit 165. The component feature extraction subunit 165 may be configured to extract features such as color-based features and texture-based features from each modified PCB component image generated by the PCB image preprocessing subunit 161. The component classification subunit 166 may be configured to classify PCB components (e.g., based at least in part on the type of those PCB components and/or based other properties of those PCB components) using the component-level features extracted by the component feature extraction subunit 165.

The model evaluation unit 153 may include a PCB image annotation subunit 171, a knowledgebase subunit 172, and an evaluation subunit 173. The PCB image annotation subunit 171 may be configured to obtain (e.g., based at least in part on human-generated data) ground-truth information about various PCB components associated with the PCBs whose images are obtained by the image acquisition unit 151. The knowledgebase subunit 172 may be configured to store the PCB images obtained by the image acquisition unit 151 as well as the ground-truth information generated by the PCB image annotation subunit 171. The evaluation subunit 173 is configured to compare the PCB component classifications generated by the image analysis unit 152 with the ground-truth information maintained in the knowledgebase subunit 172 to generate a measure of detection accuracy of the detection models utilized by the image analysis unit 152.

Exemplary PCB Design Computing Entity

FIG. 2 provides a schematic of a PCB design computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the PCB design computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the PCB design computing entity 106 may include or be in communication with one or more processing elements 205 (also referred to as processors, processing circuitry, and/or similar terms used herein interchangeably) that communicate with other elements within the PCB design computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the PCB design computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the PCB design computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the PCB design computing entity 106 with the assistance of the processing element 205 and operating system.

As indicated, in one embodiment, the PCB design computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the PCB design computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the PCB design computing entity 106 may include or be in communication with one or more input elements, such as a keyboard input, a mouse input, a touch screen/display input, motion input, movement input, audio input, pointing device input, joystick input, keypad input, and/or the like. The PCB design computing entity 106 may also include or be in communication with one or more output elements (not shown), such as audio output, video output, screen/display output, motion output, movement output, and/or the like.

Exemplary Client Computing Entity

FIG. 3 provides an illustrative schematic representative of an client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the PCB design computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the PCB design computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the PCB design computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the PCB design computing entity 106 and/or various other computing entities.

In another embodiment, the client computing entity 102 may include one or more components or functionality that are the same or similar to those of the PCB design computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

IV. Exemplary System Operations

FIG. 4 is a flowchart diagram of an example process 400 for performing PCB component estimation. Via the various steps/operations of the process 400, the PCB design computing entity 106 can efficiently and reliably detect components of a PCB, which in turn facilitates generating a bill of materials for the PCB and refining various operations of PCB manufacturing processes.

The process 400 begins at step/operation 401 with the PCB design computing entity 106 identifying a PCB image of the PCB. The PCB image may be any image that includes visual depictions of various components of a PCB. Here, the PCB image may have been obtained using any one of several different imaging modalities such as digital camera, optical microscope, x-ray, Terahertz imaging camera, and/or the like. The objective of the step/operation 401 in various embodiments being to obtain sufficient data through the image so that components can be identified, differentiated from the board, and/or differentiated from each other. For instance, in some embodiments, the PCB image may be a direct-lighting image, which is an image of the PCB taken using a light source that is reflected from an angle that is normal to the PCB. An operational example of a direct-lighting image 500 is depicted in FIG. 5. In some embodiments, the PCB image may be a non-direct-lighting image, which is an image of the PCB taken using a light source that is reflected from an angle that is not normal to the PCB. The direct-lighting image 500 of FIG. 5 can be compared to the non-direct-lighting images 601-604 of the same PCB as depicted in FIG. 6.

At step/operation 402, the PCB design computing entity 106 performs chromaticity-based background subtraction on the PCB image to generate a background-subtracted PCB image. Chromaticity-based background subtraction may refer to any computer-implemented process that identifies a foreground of a PCB-related image (e.g., the PCB image identified at step/operation 401) and a background of the PCB-related image based at least in part on the chromatic intensity of pixels of the PCB-related image, where the foreground of the PCB-related image may be a collection of pixels of the PCB-related image that includes the various PCB components of the PCB, while the background of the PCB-related image may be a collection of pixels of the PCB-related image that includes the board on which the PCB components are located.

Accordingly, in various embodiments, the PCB design computing entity 106 may perform the chromaticity-based background subtraction on the PCB image to generate the background-subtracted PCB image by determining a normalized chromatic intensity measure for each pixel of the PCB image and performing thresholding based at least in part on the determined per-pixel normalized chromatic intensity measures for the pixels to determine background pixels and foreground pixels. Here, an objective of performing the chromaticity-based background subtraction on the PCB image in some embodiments is to cancel out effects of intensity and saturation of colors used within the PCB image. Therefore, in these particular embodiments, the PCB design computing entity 106 may use chromaticity-based background subtraction along with a threshold configured to isolate background and foreground portions of the PCB image to generate the background-subtracted PCB image.

For instance, the PCB design computing entity 106 may be configured in various embodiments to perform the chromaticity-based background subtraction with respect to a particular pixel of the PCB image via the various steps/operations shown in FIG. 7. The process depicted in FIG. 7 begins at step/operation 701 with the PCB design computing entity 106 determining a normalized chromatic intensity measure for the particular pixel of the PCB image. In particular embodiments, the PCB design computing entity 106 determines the per-pixel normalized chromatic intensity measure for the particular pixel based at least in part on a value for the colorfulness component of a chromatic representation of a color value for the particular pixel. In some embodiments, the PCB design computing entity 106 normalizes per-pixel chromatic intensity measures across the PCB image to expand the range of the noted per-pixel chromatic intensity measures to generate a normalized chromatic measure for a particular pixel. Here, the PCB design computing entity 106 may perform a normalization of the pixel value across the color intensity channels associated with the pixel value to generate the normalized chromatic intensity measure for the pixel. For example, the PCB design computing entity 106 may divide each pixel value by the sum of corresponding pixel values in the red, green, and blue channels.

At step/operation 702, the PCB design computing entity 106 determines whether the normalized chromatic intensity measure for the particular pixel of the PCB image satisfies a chromatic intensity threshold for the PCB image. In some embodiments, the chromatic intensity threshold for the PCB image may be determined based at least in part on model definition data (e.g., model definition data including predefined algorithmic rules) stored on the storage subsystem 108.

Accordingly, in response to determining that the normalized chromatic intensity measure satisfies the chromatic intensity threshold, the PCB design computing entity 106 generates a modified pixel to replace the particular pixel within the background-subtracted PCB image, where the modified pixel indicates that the corresponding location of the background-subtracted PCB image is in a background portion of the PCB image at step/operation 703. For example, in particular embodiments, the PCB design computing entity 106 generates the modified pixel by setting a value of the pixel to zero to indicate the particular pixel is a background pixel. In response to determining that the normalized chromatic intensity measure fails to satisfy the chromatic intensity threshold, the PCB design computing entity 106 generates a modified pixel to replace the particular pixel within the background-subtracted PCB image, wherein the particular pixel indicates that the corresponding location of the background-subtracted PCB image is in a foreground portion of the background-subtracted PCB image at step/operation 703. For example, in particular embodiments, the PCB design computing entity 106 generates the modified pixel by setting a value of the pixel to a value such as one to indicate the particular pixel is a foreground pixel. Therefore, in this example, once a modified pixel has been generated for each pixel, the result is a background-subtracted PCB image having background pixels set to a value of zero and foreground pixels set to a value of one. Thus, in the example, the background-subtracted PCB image may be considered a binary representation of the PCB image.

Returning to FIG. 4, at this point, the PCB design computing entity 106 in various embodiments performs morphological noise removal on the background-subtracted PCB image to generate a noise-removed PCB image at step/operation 403. Here, morphological noise removal may be performed on the background-subtracted PCB image because oftentimes images produced through thresholding (e.g., binary images) contain numerous imperfections (such as holes and islands). In particular, regions produced by simple thresholding (e.g., binary regions) can be distorted by noise and texture. Morphological operations can help in removing these imperfections by accounting for the form and structure of the image. These operations are viewed as a collection of non-linear operations related to the shape or morphology of features in an image. Morphological operations may in some embodiments rely only on the relative ordering of pixel values, not on their numerical values, and therefore are especially suited to the processing of images such as binary images. These operations can also be extended to greyscale images such that their light transfer functions are unknown and therefore their absolute pixel values are of no or minor interest.

In some embodiments, the PCB design computing entity 106 may be configured to perform the morphological noise removal using a computer-implemented process that performs a sequence of one or more morphological operations that may include one or more morphological erosion operations and/or one or more morphological dilation operations on the background-subtracted PCB image to generate the noise-removed PCB image. Here, in particular embodiments, an objective of performing the sequence of one or more morphological operations as part of the morphological noise removal operation is to remove "holes" and "islands" from the background-subtracted PCB image.

A morphological technique generally may include probing an image with a template referred to as a structuring element that is comprised of a small matrix of pixels, with each pixel having an "on" or "off" value (e.g., a one value or a zero value). The structuring element has matrix dimensions identifying a size of the structuring element, a shape identifying the pattern of values, and one of the pixels with an "on" value identified as the origin of the structuring element. The shape and size of the structuring elements are adapted in some embodiments to the geometric properties of the images objects of interest (e.g., the components of the PCB). In addition, the shape of the structuring element may be selected according to some prior knowledge about the geometry of the image objects of interest (e.g., the components of the PCB). Here, in particular embodiments, the structuring element(s) used by the PCB design computing entity 106 may be determined based at least in part on model definition data stored on the storage subsystem 108. The structuring element is positioned at all locations within the image and compared with a corresponding neighborhood of pixels at each of the locations in the image. A "fit" is found if each pixel set to the "on" value (e.g., one) has a corresponding pixel set to the "on" value in the neighborhood of pixels at the location of the image. Here, morphological erosion is performed by setting an "on" value at the origin of the structuring element at every location of the image at which the structuring element "fits" the image. A "hit" is found if at least one pixel set to the "on" value (e.g., one) has a corresponding pixel set to the "on" value in the neighborhood of pixels at the location of the image. Here, morphological dilation is performed by setting an "on" value at the origin of the structuring element at every location of the image at which the structuring element "hits" the image.

For example, turning now to FIG. 8, a process is depicted that may be used in some embodiments by the PCB design computing entity 106 in performing the morphological noise removal on the background-subtracted PCB Image. The process depicted in FIG. 8 begins at step/operation 801 with the PCB design computing entity 106 performing morphological erosion on the background-subtracted PCB image to generate an eroded image. At step/operation 802, the PCB design computing entity 106 performs morphological dilation on the eroded image to generate a dilated image. Finally, at step/operation 803, the PCB design computing entity 106 generates the noise-removed PCB image based at least in part on the dilated image. In other words, in at least some embodiments of the present invention, the result of performing the one or more morphological operations on the background-subtracted PCB image is the noise-removed PCB image.

Returning to FIG. 4, at step/operation 404, the PCB design computing entity 106 performs object localization on the noise-removed PCB image to identify one or more PCB component estimations within the noise-removed PCB image. In particular embodiments, the PCB design computing entity 106 may perform object localization using a computer-implemented process that is configured to identify one or more PCB component estimations within the noise-removed image based at least in part on detecting contiguous pixel segments within at least a part of the noise-removed image (e.g., within a detected foreground of the noise-removed image).

Accordingly, in some embodiments, the PCB design computing entity 106 performs the object localization by performing segmentation on the foreground pixels of the noise-removed PCB image to detect one or more contiguous pixel segments, and determining the one or more PCB component estimations within the noise-removed PCB image based at least in part on the one or more contiguous pixel segments. For example, the PCB design computing entity 106 may perform a depth-first-search-based segmentation.

At step/operation 405, the PCB design computing entity 106 generates a bill of materials for the PCB based at least in part on the one or more PCB component estimations. The bill of materials may include a list of all components of the PCB, as well as the specifications of the listed components. In some embodiments, the PCB design computing entity 106 utilizes the PCB component estimations as initial PCB component estimations for one or more other PCB component estimation processes (e.g., a PCB component estimation process utilizing at least one of superpixel segmentation and shadow detection segmentation), where the one or more other PCB component estimation processes are configured to generate final PCB component estimations. Thereafter, the PCB design computing entity 106 may generate the bill of materials for the PCB based at least in part on the final PCB component estimations.

Finally, at step/operation 406, the PCB design computing entity 106 in particular embodiments refines one or more manufacturing processes of the PCB based at least in part on the bill of materials. For example, in some embodiments, the bill of materials may be provided to a PCB design software to manufacture the PCB. In some embodiments, the bill of materials may be used to perform hardware assurance (e.g., hardware trojan detection and/or manufacture validation) during the PCB manufacturing process. In some embodiments, the bill of materials may be used to perform reverse-engineering on existing devices (e.g., legacy devices) to obtain information that can be used to refine the manufacturing process of the PCB. In some embodiments, the bill of materials may be used to perform industrial assessment (e.g., cost estimation breakdown, quality assurance, benchmarking, and/or the like) of a PCB manufacturing process in order to refine the PCB manufacturing process. In some embodiments, the bill of materials may be used to perform standardization across various PCB manufacturing process, where the generated standards can be used to refine one or more PCB manufacturing processes. Those of ordinary skill in the art can envision other uses of the bill of materials in refining manufacturing processes in light of this disclosure.

In addition, while various embodiments of the present disclosure have been described with respect to utilizing the bill of materials for refining PCB manufacturing processes, a person of ordinary skill in the relevant technology will recognize that bill of materials may be used to perform tasks other than refining PCB manufacturing processes, such as to perform reverse-engineering on foreign PCB-related technologies, perform reverse-engineering on legacy PCB-related devices, perform hardware trojan detection of PCB-related technologies, perform hardware manufacturer validation of PCB-related technologies, perform industrial assessment of PCB-related technologies, perform standardization of PCB-related technologies, perform technology trend analysis of PCB-related technologies, and/or the like.

Finally, in some embodiments, the PCB design computing entity 106 may be configured to display an output image that highlights respective locations of the one or more PCB component estimations within the PCB image. An operational example of such a PCB component estimation output image 900 is presented in FIG. 9. As depicted in FIG. 9, the PCB component estimation output image 900 highlights PCB component estimations via white-colored pixel segments, e.g., white-colored pixel segments 901-903. Each white-colored pixel segment may include a contiguous combination of pixels determined to be within a detected foreground of the PCB direct-lighting image 500 of FIG. 5. For example, the white-colored pixel segment 901 corresponds to component 501 depicted in the PCB image 500 of FIG. 5. As a further example, the white-colored pixel segment 902 corresponds to component 502 depicted in the PCB direct-lighting image 500 of FIG. 5. As yet another example, the white-colored pixel segment 903 corresponds to component 503 depicted in the PCB direct-lighting image 500 of FIG. 5.

V. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for performing printed circuit board (PCB) component estimation, the computer-implemented method comprising:
    performing chromaticity-based background subtraction via one or more processors executing on a PCB design computing entity on a PCB image of the PCB to generate a background-subtracted PCB image, wherein the chromaticity-based background subtraction comprises:
        for each particular pixel in the PCB image,
            determining a normalized chromatic intensity measure for the particular pixel,
            determining whether the normalized chromatic intensity measure satisfies a chromatic intensity threshold,
            responsive to determining the normalized chromatic intensity measure satisfies the chromatic intensity threshold, generating a modified pixel for the particular pixel within the background-subtracted PCB image that indicates that the particular pixel is a background pixel, and
            responsive to determining the normalized chromatic intensity measure fails to satisfy the chromatic intensity threshold, generating the modified pixel for the particular pixel within the background-subtracted PCB image that indicates that the particular pixel is a foreground pixel;
    performing morphological noise removal on the background-subtracted PCB image via the one or more processors executing on the PCB design computing entity to generate a noise-removed PCB image, wherein the morphological noise removal comprises performing a sequence of at least one of one or more morphological erosions or one or more morphological dilations on the background-subtracted PCB image;
    performing object localization on the noise-removed PCB image via the one or more processors executing on the PCB design computing entity to identify one or more PCB component estimations within the noise-removed PCB image, wherein the object localization comprises performing segmentation on the noise-removed PCB image to detect contiguous pixel segments within the noise-removed PCB image to identify the one or more PCB component estimations;
    generating a bill of materials for the PCB by the one or more processors executing on the PCB design computing entity using the one or more PCB component estimations; and
    refining, using the one or more processors, one or more PCB manufacturing processes based at least in part on the bill of materials.

2. The computer-implemented method of claim 1, wherein determining the normalized chromatic intensity measure for the particular pixel comprises performing, by the one or more processors executing on the PCB design computing entity, a normalization of a pixel value for a colorfulness component of a chromatic representation of a color value for the particular pixel across color intensity channels associated with the pixel value.

3. The computer-implemented method of claim 1, wherein the segmentation is performed on foreground pixels of the noise-removed PCB image.

4. The computer-implemented method of claim 1, wherein the segmentation is a depth-first-search-based segmentation.

5. The computer-implemented method of claim 1 further comprising displaying an output image that highlights respective locations of the one or more PCB component estimations within the PCB image.

6. The computer-implemented method of claim 1, wherein the PCB image is a non-direct-lighting image of the PCB.

7. The computer-implemented method of claim 1, wherein the PCB image is a direct-lighting image of the PCB.

8. An apparatus for performing printed circuit board (PCB) component estimation, the apparatus comprising at least one processor and at least one memory including program code, the at least one memory and the program code configured to, with the at least one processor, cause the apparatus to at least:
perform chromaticity-based background subtraction on a PCB image of the PCB to generate a background-subtracted PCB image, wherein the chromaticity-based background subtraction comprises:
for each particular pixel in the PCB image,
determining a normalized chromatic intensity measure for the particular pixel,
determining whether the normalized chromatic intensity measure satisfies a chromatic intensity threshold,
responsive to determining the normalized chromatic intensity measure satisfies the chromatic intensity threshold, generating a modified pixel for the particular pixel within the background-subtracted PCB image that indicates that the particular pixel is a background pixel, and
responsive to determining the normalized chromatic intensity measure fails to satisfy the chromatic intensity threshold, generating the modified pixel for the particular pixel within the background-subtracted PCB image that indicates that the particular pixel is a foreground pixel;
perform morphological noise removal on the background-subtracted PCB image to generate a noise-removed PCB image, wherein the morphological noise removal comprises performing a sequence of at least one of one or more morphological erosions or one or more morphological dilations on the background-subtracted PCB image;
perform object localization on the noise-removed PCB image to identify one or more PCB component estimations within the noise-removed PCB image, wherein the object localization comprises performing segmentation on the noise-removed PCB image to detect contiguous pixel segments within the noise-removed PCB image to identify the one or more PCB component estimations;
generate a bill of materials for the PCB using the one or more PCB component estimations; and
refine one or more PCB manufacturing processes based at least in part on the bill of materials.

9. The apparatus of claim 8, wherein the at least one memory and the program code are configured to, with the at least one processor, cause the apparatus to determine the normalized chromatic intensity measure for the particular pixel by performing a normalization of a pixel value for a colorfulness component of a chromatic representation of a color value for the particular pixel across color intensity channels associated with the pixel value.

10. The apparatus of claim 8, wherein the at least one memory and the program code are configured to, with the at least one processor, cause the apparatus to perform the segmentation on foreground pixels of the noise-removed PCB image.

11. The apparatus of claim 8, wherein the segmentation is a depth-first-search-based segmentation.

12. The apparatus of claim 8, wherein the at least one memory and the program code are configured to, with the at least one processor, cause the apparatus to display an output image that highlights respective locations of the one or more PCB component estimations within the PCB image.

13. The apparatus of claim 8, wherein the PCB image is a non-direct-lighting image of the PCB.

14. The apparatus of claim 8, wherein the PCB image is a direct-lighting image of the PCB.

15. A non-transitory computer storage medium comprising instructions for performing printed circuit board (PCB) component estimating, the instructions being configured to cause one or more processors to at least perform operations configured to:
perform chromaticity-based background subtraction on a PCB image of the PCB to generate a background-subtracted PCB image, wherein the chromaticity-based background subtraction comprises:
for each particular pixel in the PCB image,
determining a normalized chromatic intensity measure for the particular pixel,
determining whether the normalized chromatic intensity measure satisfies a chromatic intensity threshold,
responsive to determining the normalized chromatic intensity measure satisfies the chromatic intensity threshold, generating a modified pixel for the particular pixel within the background-subtracted PCB image that indicates that the particular pixel is a background pixel, and
responsive to determining the normalized chromatic intensity measure fails to satisfy the chromatic intensity threshold, generating the modified pixel for the particular pixel within the background-subtracted PCB image that indicates that the particular pixel is a foreground pixel;
perform morphological noise removal on the background-subtracted PCB image to generate a noise-removed PCB image, wherein the morphological noise removal comprises performing a sequence of at least one of one or more morphological erosions or one or more morphological dilations on the background-subtracted PCB image;
perform object localization on the noise-removed PCB image to identify one or more PCB component estimations within the noise-removed PCB image, wherein the object localization comprises performing segmentation on the noise-removed PCB image to detect contiguous pixel segments within the noise-removed PCB image to identify the one or more PCB component estimations;
generate a bill of materials for the PCB using the one or more PCB component estimations; and refine one or more PCB manufacturing processes based at least in part on the bill of materials.

16. The non-transitory computer storage medium of claim 15, wherein the instructions are configured to cause the one or more processors to at least determine the normalized chromatic intensity measure for the particular pixel by performing a normalization of a pixel value for a colorfulness component of a chromatic representation of a color value for the particular pixel across color intensity channels associated with the pixel value.

17. The non-transitory computer storage medium of claim 15, wherein the instructions are configured to cause the one or more processors to at least perform the segmentation on foreground pixels of the noise-removed PCB image.

18. The non-transitory computer storage medium of claim 15, wherein the segmentation is a depth-first-search-based segmentation.

19. The non-transitory computer storage medium of claim 15, wherein the instructions are configured to cause the one or more processors to at least display an output image that highlights respective locations of the one or more PCB component estimations within the PCB image.

20. The non-transitory computer storage medium of claim 15, wherein the PCB image is a non-direct-lighting image of the PCB.

* * * * *